Jan. 14, 1969 N. GORDON 3,421,728
ADJUSTABLE MIRROR
Filed March 1, 1966 Sheet 1 of 2

INVENTOR.
NORMAN GORDON
BY
Morgan, Finnegan, Durham & Pine
ATTORNEYS.

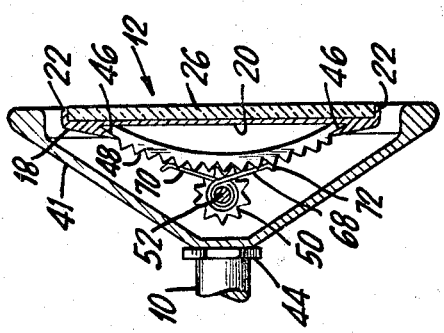
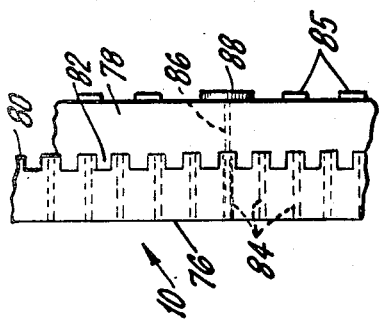
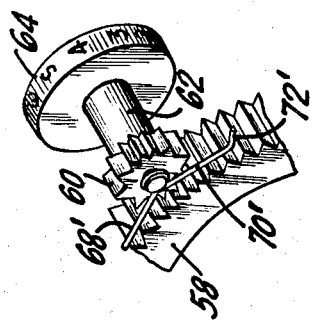
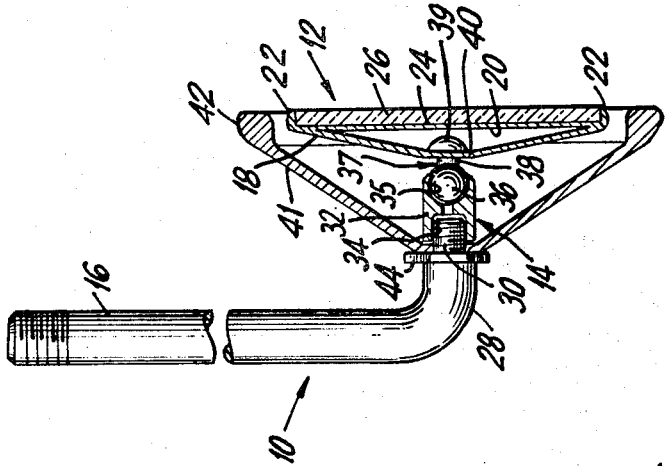

United States Patent Office 3,421,728
Patented Jan. 14, 1969

3,421,728
ADJUSTABLE MIRROR
Norman Gordon, 164 Harvard Drive,
Ormond Beach, Fla. 32074
Filed Mar. 1, 1966, Ser. No. 530,861
U.S. Cl. 248—477                                2 Claims
Int. Cl. A47g 1/24

This invention relates to an improved adjustable mirror, and more particularly, to a rear view mirror with a precise alignment device.

Presently available adjustable mirrors, such as rear view mirrors utilized in automobiles, trucks, planes, boats or other installations where vision is required in a direction other than that faced by the operator, do not have suitable means for quickly and precisely aligning the mirror each time it is used. Mirrors presently in use must be positioned by actually grasping the mirror and manipulating it by hand, and, inasmuch as this is a fine adjustment, it is difficult and time consuming. In a moving vehicle, moreover, such adjustment causes the driver to divert his attention from the intended path of travel which may be hazardous.

Furthermore, with present mirrors there are no means for indicating its exact desired position once it is obtained. When the mirror is out of the desired alignment or when another person has used the mirror in the interim and changed the position of the mirror, one must go through the time consuming chore of resetting the mirror.

It is, therefore, one object of this invention to provide a new and improved adjustable mirror.

It is another object of this invention to provide an adjustable mirror that can be precisely set and reset to the exact same position.

It is still another object of this invention to provide an adjustable mirror that can be quickly set and reset to the desired position.

It is a further object of this invention to provide an adjustable mirror having a plurality of visually observable settings for quickly and precisely adjusting the mirror to the desired position.

In accordance with the present invention there is provided support means, a mirror assembly having a mirror element movably connected to the support means, and adjusting means connected to the mirror assembly for rotating the mirror element about at least one of its axes. In the preferred embodiment of the invention, the adjusting means is provided with a plurality of visually observable settings, such as numbers, for quickly and precisely adjusting the mirror element to the desired position. Once the desired position has been ascertained, the mirror element can be immediately reset to the exact same position. All one need do is remember the desired setting, such as the desired number, and then set the adjusting means to that setting, such as "4."

Additional objects and advantages of the invention will be set forth in part hereinafter and in part will be obvious herefrom or may be learned by practice with the invention, the same being realized and attained by means of the steps, combinations and improvements pointed out in the appended claims.

The accompanying drawings referred to herein and constituting a part hereof, illustrate one embodiment of the invention, and together with the description, serve to explain the principles thereof.

FIGURE 2 is a side view, partly in section, of the rear view mirror embodying the present invention, particularly illustrating one embodiment of the connection between the mirror and the support means of a vehicle;

Figure 1:
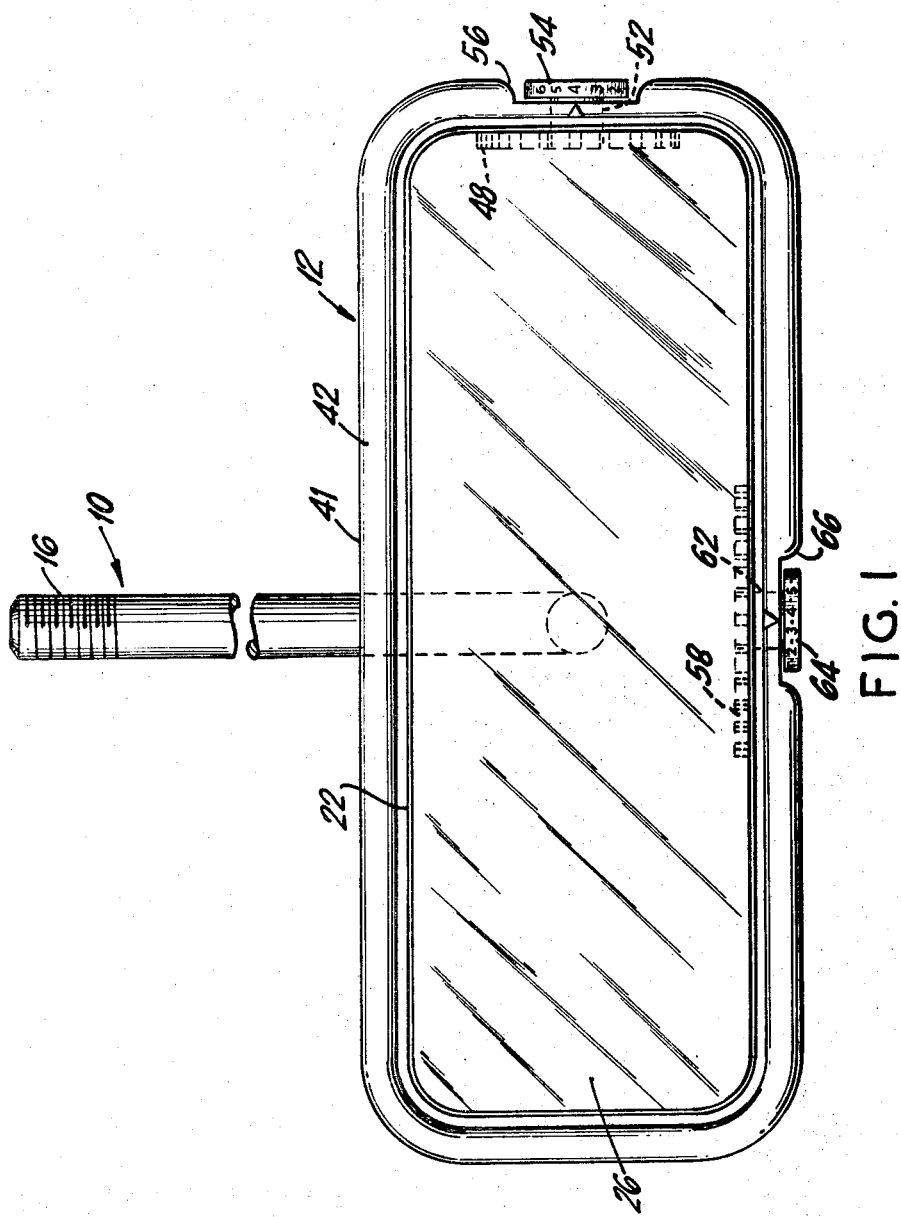
FIGURE 1 is a front view of a rear view mirror embodying the present invention.

FIGURE 3 is also a side view, partly in section, embodying the present invention, illustrating one embodiment of the precise adjusting means for rotating the mirror in the horizontal; and FIGURE 4 is a detailed perspective view of one embodiment of the precise adjusting means; and FIGURE 5 is a detailed view illustrating one embodiment of the adjusting means for precisely obtaining the desired mirror height.

It is to be understood that both the foregoing general description and the following detailed description are exemplary and are not restrictive of the invention.

Referring to the drawings, there is shown an L-shaped support arm 10 and the mirror assembly of the present invention, generally indicated at 12, movably connected to the arm 10 by an interconnector 14.

The upper end 16 of the arm 10 is threaded so that it can be secured or fixed to a vehicle (not shown) by any of several well known methods. Although the arm 10 is particularly adapted for use with an automobile, it is to be understood that the mirror assembly 12 can be supported by other suitable means to adapt it for use with other vehicles such as trucks, boats, planes, or other installations where mirrors are necessary.

The mirror assembly 12 includes a frame 18 having a generally trapezoidal cross-section as best shown in FIGURE 2. Extending from the frame base 20 are flanges 22, which together with the frame base 20, define a recess 24 for a rectangularly shaped mirror element 26. The element 26 can be any one of the mirrors presently in use, including the glare-proof type, by simply providing the conventional button to change the angle of reflection to remove the glare from the eyes of the driver.

Referring now to the connection between the mirror assembly 12 and the arm 10, the free end 28 of such arm 10 has a reduced threaded portion 30. A sleeve 32 having an internal threaded recess 34 is threaded onto the reduced portion 30 of the arm 10. The forward end of the sleeve 32 has a socket 35 rotatably housing a ball 36. A member 37 having a shaft 38 with a head 39 extends through the wall 40 opposite the frame base 20 with the head 39 abutting the internal surface of the wall 40. In turn, the ball 36 is secured to the end of the shaft 38 that extends through the wall 40. Accordingly, when the mirror assembly 12 is moved, the ball 36 will rotate in its socket 35.

About the mirror assembly 12 is an external frame 41 having a rim 42 therearound slightly spaced from and flush with the mirror assembly 12. To secure the frame 41 in position, its rearward central portion is threaded upon the reduced portion 30 of the arm 10 between a lock nut 44 and the sleeve 32.

For precisely rotating the mirror element 26 about its horizontal axis to obtain the desired fine settings, there is provided a groove 46 along one side of the mirror frame 18 as best shown in FIGURE 3. Fastened in ends of the groove 46 is a rack gear 48 having an arcuate shape. Engaging the gear 48 within the frame 41 is a pinion gear 50 which in turn is secured to the reduced end portion of a shaft 52 that is rotatably mounted in and extends through the side of the external frame 41 as best shown in FIGURE 1. For rotating the pinion gear 50 there is provided a knob 54 secured to the outer end of the shaft 52 that is housed in a recess 56 in the side of the frame 41. The knob 52 has the numbers 1 to 10 embossed thereon. These numbers correspond to the possible fine settings obtainable with this embodiment of the invention.

For precisely rotating the mirror element 26 about its vertical axis, there is provided a similar arrangement at the bottom of the mirror assembly 12. As shown in FIGURE 1 this includes a rack gear 58 also having an arcuate shape secured in a groove (not shown) in the bottom of the frame 18. Engaging the rack gear 58 within the frame 41 is a pinion gear 60 (see FIG. 4), and as before, there is a shaft 62 rotatably mounted in and extending through the frame 41, but in this instance, in the bottom of the frame 41. A knob 64 within a recess 66 in the bottom of the frame 41 is secured to the outer end of the shaft 62. The knob 64 also contains the embossed numbers 1 to 10 thereon which correspond to the possible fine settings.

In operation, the fine settings of the mirror element 26 are obtained by rotating the knobs 54 and 64 one at a time to the desired setting. For instance, by rotating the knob 54 to setting 4, the pinion gear 50 will rotate the rack gear 48 which in turn causes the mirror element 26 to rotate a fixed amount about the horizontal axis. Correspondingly, by rotating the knob 64, for example, to setting 3, the pinion gear 60 will rotate the rack 58 and the mirror element 26 about the vertical axis to the desired setting. Accordingly, once the desired setting is known, a driver can quickly reset the mirror element 26 to the same exact position. All he need do is remember his number combination, for example "4–3," and then adjust the knobs 54 and 64 to this precise setting.

To make a change in setting audible, moreover, there are preferably provided leaf springs 68 and 68' looped about the reduced end portion of the shafts 52 and 62, respectively, adjacent the outer surface of the gears 50 and 60 as best shown in FIGURES 3 and 4. Each spring 68, 68' is slidably mounted about the shaft, such that the shafts 52 and 62 move relative to the stationary springs 68, 68'. Each spring 68, 68' also includes a pair of legs 70, 70' which engage rack gears 48 and 58, respectively, at two locations spaced on either side of their respective shafts 52 and 62.

The mirror assembly 12 of the present invention also includes means for precisely adjusting the height of the mirror 12. As illustrated in FIGURE 5, the support arm 10 is separable into two parts 76 and 78 above the mirror assembly 12 within easy reach of the driver. Each part 76 and 78 includes interengageable gears 80 and 82, respectively. The part 76 also includes a series of spaced threaded bores 84 that extend therethrough and which correspond to the desired settings. Numbers from 1 to 10 are embossed on the part 78 and are so placed to be visually observable by the driver as generally indicated by the reference 85, to indicate the obtainable precise settings. The part 78 includes only one internally threaded bore 86 that extends therethrough. Extending through the bore 86 and one of the bores 84 is a screw 88 which will secure the two interengaging parts 76 and 78 once the mirror element 26 has been adjusted to its precise height.

The foregoing exemplary adjustable mirror also insures that once the mirror assembly 12 is set, it will not shift or move due to vibration or other undesirable movement of the vehicle. This is provided by the interengaging gear teeth and spring employed by the adjusting means for rotating the mirror element 26 about its axes, and by the interengaging gears 80 and 82 of the means for adjusting the height of the mirror element 26.

If desired in "luxury class" automobiles, the mirror assembly 12 can be operated electrically. In such instance the adjustments would be made by placing the numbered knobs 54 and 64 in the dash board which would in turn cause servo motors positioned in the control console or behind the fire wall to move flexible drive shafts connected to the previously described rack and pinion gears in the mirror.

It is to be understood that the invention in its broader aspects is not limited to the specific elements and steps shown and described, but also includes within the scope of the accompanying claims, any departures made from such elements or steps which do not sacrifice its chief advantages.

What is claimed is:

1. An adjustable mirror for a vehicle, comprising a support arm connected to the vehicle, a rear view mirror movably connected to said support arm, a frame positioned about said mirror and secured to said support arm, an arcuately shaped rack gear secured to the bottom of the rear face of said rear view mirror within said frame, a pinion gear within said frame engaging said rack gear for rotation of said rear view mirror about its horizontal axis, a shaft connected to said pinion gear and extending through said frame, a knob connected to said shaft outside said frame for rotating said pinion, said knob having a plurality of settings thereon which are visually observable for precise adjustment of said rear view mirror, a second arcuately shaped gear secured to the side of the rear face of said rear view mirror within said frame, a second pinion gear within said frame engaging said second rack gear for rotation of said rear view mirror about its vertical axis, a second shaft connected to said second pinion gear and extending through the side of said frame, a second knob connected to said second shaft outside of the frame for rotating said second pinion, said second knob also having a plurality of settings thereon which are visually observable for precise adjustment of said rear view mirror, and means operatively connected between each pinion and corresponding rack gear for making an audible noise when the setting of the mirror is rotated either about the vertical or horizontal axis of said mirror.

2. The rear view mirror set forth in claim 1 wherein said mirror includes means for adjusting the height of said mirror, said means having a plurality of settings thereon which are visually observable for precise adjustment of said mirror.

References Cited

UNITED STATES PATENTS

| | | | |
|---|---|---|---|
| 2,066,982 | 1/1937 | Kronquist | 248—487 |
| 2,504,386 | 4/1950 | Brady | 248—485 X |
| 2,663,216 | 12/1953 | Carr | 248—487 X |
| 2,664,785 | 1/1954 | Roehrig | 248—487 |
| 2,834,316 | 5/1958 | Perez | 116—133 X |

CHANCELLOR E. HARRIS, *Primary Examiner.*

U.S. Cl. X.R.

248—487